United States Patent [19]

Sanda, Jr.

[11] 3,928,291
[45] Dec. 23, 1975

[54] TIRE TREADS AND THEIR PRODUCTION

[75] Inventor: Joseph C. Sanda, Jr., Youngstown, N.Y.

[73] Assignee: The Firestone Tire & Rubber Company, Akron, Ohio

[22] Filed: Sept. 12, 1974

[21] Appl. No.: 505,426

Related U.S. Application Data

[63] Continuation-in-part of Ser. No. 260,792, June 8, 1972, abandoned.

[52] U.S. Cl. .............. 260/75 R; 260/2.3; 260/75 T; 260/75 A
[51] Int. Cl.² .................................... C08G 63/76
[58] Field of Search ............. 260/75 A, 75 R, 75 T, 260/94.7 a, 2.3

[56] References Cited
UNITED STATES PATENTS

| | | |
|---|---|---|
| 3,107,235 | 10/1963 | Larson et al. ........................... 260/75 |
| 3,311,151 | 3/1967 | Willis et al. ..................... 260/889 X |
| 3,515,772 | 6/1970 | Lubowitz et al. ................... 260/836 |
| 3,548,408 | 12/1970 | Worrall .............................. 260/87.3 |
| 3,674,743 | 7/1972 | Verdol et al. .................. 260/75 A X |

OTHER PUBLICATIONS
Grant, *Hackh's Chemical Dictionary*, McGraw–Hill Book Company, N.Y., 4th Ed., (1969), p. 522.

*Primary Examiner*—Harold D. Anderson
*Assistant Examiner*—W. C. Danison, Jr.

[57] ABSTRACT

In the production of vehicle tires, a self-vulcanizing tread composition which includes a reinforcing agent is applied to the tread portion of a tire mold and a tire body is positioned in the mold against this tread. The tread is prepared from an elastomeric polymer selected from the class consisting of (a) polyhydroxy homopolymers and copolymers of conjugated dienes which contain 4 to 6 carbon atoms, (b) polyhydroxy copolymers of such a conjugated diene and an aromatic vinyl monomer, (c) polyhydroxy copolymers of such a conjugated diene and a vinyl nitrile monomer, (d) polyhydroxy polymers from hydrocarbon monoolefins, (e) polyhydroxy polyethers, and (f) polyhydroxy polyesters, by reacting the same with an aliphatic or aromatic di(carbonyl halide) of the formula Hal—O:C—C:O—Hal or Hal—O:C—X—C:O—Hal in which Hal is chlorine or bromine and X is an aliphatic or aromatic hydrocarbon moiety. The resulting polymer may be subjected to a supplemental cure with sulfur, peroxide or polyol.

10 Claims, 1 Drawing Figure

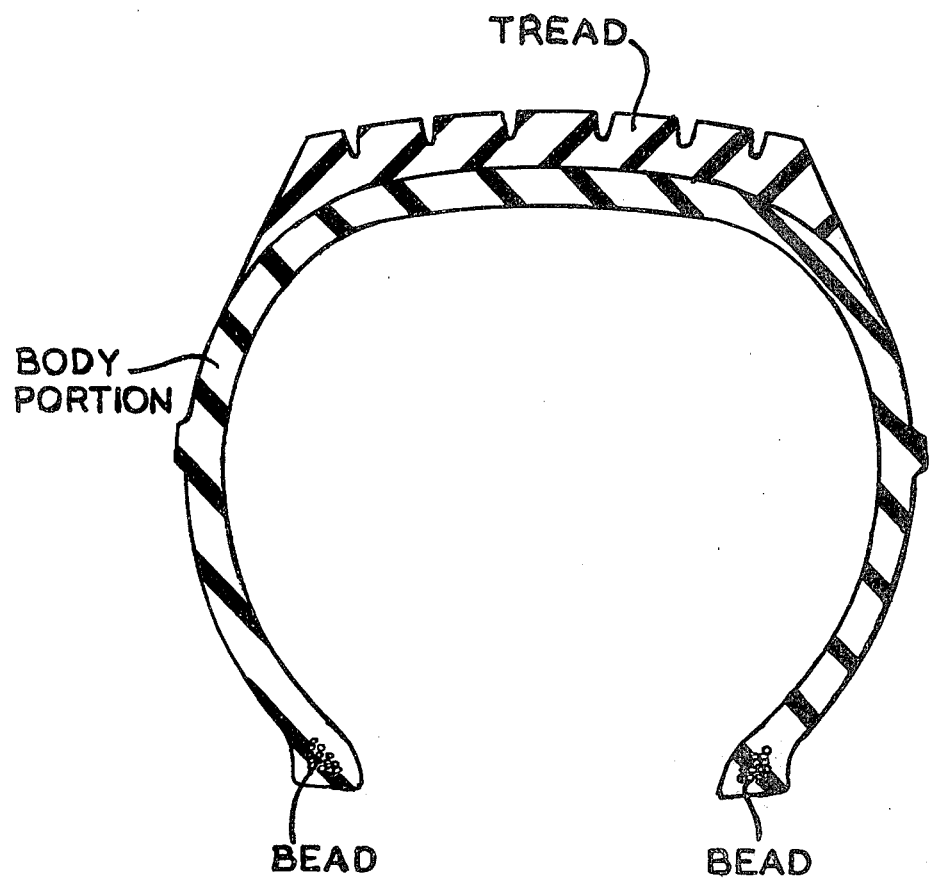

TIRE TREADS AND THEIR PRODUCTION

BACKGROUND OF THE INVENTION

This application is a continuation-in-part of my application Ser. No. 260,792 filed June 8, 1972, now abandoned.

This invention relates to novel tire treads and their production. The tire body is usually cast from a liquid rubber composition and is therefore usually free of reinforcing elements although it may contain reinforcing pigments, short fibers, etc. dispersed therein. The tread is not cast, but is usually placed in a mold and the tire body is cured against it. The invention includes the new uncured composition, the new tread and the method of producing it.

The tread which includes a reinforcing agent such as carbon black or silica or a metal oxide, etc. is formed from a polyester which is a reaction product of (1) an hydroxylated polymer which contains at least two hydroxy groups and (2) a poly(carbonyl halide) of the formula Hal—O:C—C:O—Hal or Hal—O:C—X—C:O—Hal in which Hal is chlorine or bromine and X is an aliphatic or aromatic hydrocarbon moiety. The hydroxylated polymer is derived from the class consisting of (a) conjugated diene homopolymers or copolymers (e.g. polybutadiene, polyisoprene, polychloroprene, polypiperylene, butadiene-isoprene, etc.), the diene of which contains 4 to 6 carbon atoms, (b) copolymers of such a conjugated diene and an aromatic vinyl monomer (e.g. butadiene-styrene, isoprene-styrene, butadiene-vinyl naphthalene, butadiene-alpha-methyl styrene, etc.), (c) copolymers of such a conjugated diene and a vinyl nitrile monomer (e.g. butadiene-acrylonitrile, isoprene-acrylonitrile, butadiene-alpha- or beta-methylacrylonitrile, etc.), (d) polymers from hydrocarbon mono-olefins (e.g. polyisobutylene, ethylene-propylene copolymer, etc.), (e) polyethers (e.g. polytetrahydrofuran, polyoxypropylene, etc.) and (f) polyesters (polycaprolactone, etc.). The foregoing copolymers refer to rubbers produced from monomers of the usual monomer percentage ranges, and copolymers of other suitable monomer ranges. The polymer may comprise mixtures of the foregoing polymers and poly(carbonyl halide) or mixtures of any one or more of the foregoing and other rubber such as scrap vulcanized rubber mixture.

Any of the usual chain-extending poly(carbonyl halide) of the formula Hal—O:C—C:O—Hal or Hal—O:C—X—C:O—Hal in which Hal is chlorine or bromine and X is an aliphatic or aromatic hydrocarbon moiety may be used in producing the polyester, although generally a di(carbonyl halide) will be used. It will be understood that references to poly(carbonyl halide) herein include such compounds and mixtures. Thus, a hydroxy-substituted rubber of any known type may be used, as well as other acid halide-extendable polymers, and elastomeric products containing no unsaturation may be used alone or mixed with rubbers. Usually the elastomers will contain but two reactive groups but may contain more, up to three or four or five or more hydroxyl groups on the average. Scrap rubber, reclaimed rubber, etc. may be blended into the tread composition. The tread of this invention will include any substantial amount of a vulcanizate derived from a polymer with a backbone containing two or more hydroxyl groups extended with a poly(carbonyl halide), and the tread may contain any amount thereof up to 100 per cent.

In addition to curing these compositions solely with poly(carbonyl halide) other auxiliary curing agents may be employed such as sulfur cure systems (along with other pigments needed for the sulfur cure such as ZnO, stearic acid and accelerators), peroxides, aliphatic and aromatic triols, tetra-ols, etc., and acyl tri- and tetra-halides, etc. Levels of sulfur may range from 0.1 to 10.0 phr; peroxide: 0.1 to 10.0 phr; triol, tetra-ol: 0.1 to 100 phr (depending upon molecular weight); tri(carbonyl halide), etc.: 0.1 to 100 phr (depending upon molecular weight).

In producing the polyesters, about equivalent amounts of hydroxy groups and acid halide groups are needed, although if an auxiliary peroxide cure is employed, a lower amount of acid halide may be used.

In the production of tires by centrifugal casting, a number of elastomeric materials have been used. These materials are selected for their properties of pourability, with a subsequent hardening into a rubbery state suitable for use in vehicle tires, either pneumatic or non-pneumatic. It has been found, however, that the desired properties for the tread of a tire, such as skid resistance, etc. are not compatible with those properties required to sidewall areas, such as strength and a high modulus, for example. Accordingly, composite tires have been suggested, in which dissimilar materials are employed for the tread portion and the tire body. One such construction employs a pre-formed tread section of a solid natural or synthetic rubber compound which is placed in a mold, sidewalls of a polyurethane compound being centrifugally molded thereon to form a composite tire. See British Patent No. 1,118,428. The principal difficulty with this type of construction is that of obtaining good adhesion between the tread and the tire body, since these materials are quite dissimilar chemically.

THE INVENTION

Tread stocks used in carrying out this invention are to be distinguished from other tire stocks because they must have good traction, both wet and dry, and skid resistance. It is important that if a tire skids, the tread stock is not heated to such an extent that the rubber is melted sufficiently to prevent the tire from having good skid resistance. Tread stocks must be abrasion resistant in order to have long life. Also, uncured tread stocks may be much stiffer than those used in the body of a tire.

The tread stock may be a blend of the different polymers described herein and may contain small amounts of other elastomers. It will comprise at least 25 to 50 per cent or more of a polymer referred to herein. The polymers referred to herein are derived from elastomers which comprise at least two hydroxyl groups. These are preferably terminal groups. The polymers in many cases have more than two such reactive groups per chain; as many as five or more in some cases. However, the average functionality usually should be no more than 3.0. Functionality is determined here from hydroxy content data (e.g. data obtained by Willetts and Ogg hydroxyl determination, infrared analysis, etc.) and molecular weight data (e.g. VPO molecular weight, dilute solution viscosity, molecular weight, gel permeation chromatography, etc.), and considerable difficulties exist in obtaining accurate functionality in this manner.

The preparation of the polyester prepared from dihydroxy polybutadiene with chain-extending poly(carbonyl halide) may be illustrated by the following equation:

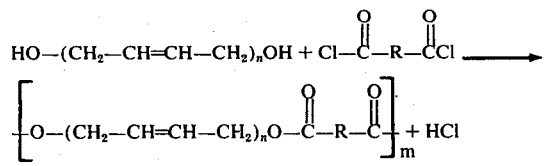

$$HO-(CH_2-CH=CH-CH_2)_nOH + Cl-\overset{O}{\underset{\|}{C}}-R-\overset{O}{\underset{\|}{C}}Cl \longrightarrow$$

$$\left[-O-(CH_2-CH=CH-CH_2)_nO-\overset{O}{\underset{\|}{C}}-R-\overset{O}{\underset{\|}{C}}-\right]_m + HCl$$

in which $n$ represents the number of butadiene groups in the polymer and $m$ represents the number of polyester repeating units. In the reaction, n will have a value of from 10 to 250 or even 300, giving molecular weights of substantially 600 to about 3000, or 5000 or 15,000, for example; and m is such that the molecular weight of the polymer is, for example, 20,000 or more after chain extension. Such reactions are well known in the art. Although the hydroxy groups are represented as being terminal, it is generally presumed that this is the case although they may not be terminal in all cases. There may be more than two hydroxy groups connected with the elastomer units. Regardless of the number of hydroxy groups, an equal number of acid halide groups is required to complete the reaction, as illustrated in the equation, and this is true regardless of whether the elastomer is polybutadiene or any other elastomer. The ratio of —COCl/—OH as represented by the formula is usually at least 1.0 and this is true regardless of the number of hydroxy groups present and regardless of what di(carbonyl halide) of the formula Hal—O:C—C:O—Hal or Hal—O:C—X—C:O—Hal in which Hal is chlorine or bromine and X is an aliphatic or aromatic hydrocarbon moiety is employed in carrying out the reaction. The poly(carbonyl halides) are very active and react with any moisture present, and react with other impurities and also are reactive with materials compounded with the polyesters such, for example, as functional groups present on carbon black or silica, etc. surfaces. Thus, when carbon black or other impure or reactive component is compounded with polyester as in the compositions of this invention, excess acid halide over and above that required for a 1:1 COCl/OH ratio may be needed in order to react with water, etc.

The amount of chain-extending di(carbonyl halide) to be used depends upon the following: (1) the molecular weight of the polymer; (2) the functionality of the polymer; (3) the molecular weight of the chain-extending agent; (4) the functionality of the chain-extending agent; (5) the amount of impurities (such as water) and (6) the reactive sites on the surfaces of fillers used, such as carbon black, etc. For instance, the amount of moisture present with the commercial carbon black may vary, and the amount of carbon black used may vary from 35 or less to 200 or more parts per 100 parts of polymer. Thus, it is impossible to accurately suggest the amount of such chain-extending agents to be used.

It is evident from the art that a wide variety of chain-extending poly(carbonyl halide) of the formula Hal—O:C—C:O—Hal or Hal—O:C—X—C:O—Hal in which Hal is chlorine or bromine and X is an aliphatic or aromatic hydrocarbon moiety may be used in carrying out the invention, as, for example, adipoyl chloride, phthaloyl chloride, succinoyl chloride, oxalyl chloride, diacid chlorides of malonic acid, glutaric acid, pimelic acid, etc., as well as other halides of these acids.

The chain-extending di(carbonyl halide) reaction preferably is carried out in the presence of an acid acceptor, such as a metal oxide or tertiary amine, etc., to react with the HCl, HBr, etc. which is formed in the condensation reaction.

The compounding ingredients in the tread stock can involve a precipitated silica or any type of carbon black such as GPF, ISAF, SAF, etc. Any type of processing oil can be used such as paraffinic, naphthenic and aromatic oils, dioctyl phthalate, etc. The higher aromatic oils appear to offer some advantages over the others.

The word "pigment" as used herein includes reinforcing pigments, antioxidants, antiozonants, fillers, peroxides, sulfur, etc.

Various types of antioxidants, antiozonants and the like may be employed as suggested by the prior-art use of such compounds in rubbers. However, the hindered phenols are probably the most useful since they evidence the most steric hindrance with acid halides.

The procedure for making tread stocks usually involves two steps. In the first step, the polymer and all compounding ingredients except the chain-extending agents are pre-mixed and ground down, preferably on a three-roll paint mill, Attritor mill, a Brabender mixer, etc. so that the reinforcing and other pigments are finely dispersed. This material is referred to as a masterbatch and has indefinite shelf life. The chain-extending agent is mixed into the masterbatch and the resulting tread compound is put into the tire mold just before the tire body is cast onto the tread. The mixing is conveniently effected on the same apparatus as used to make the masterbatch or in another mixing chamber such as a Baker-Perkins mixer. The time interval between mixing the chain-extending agent into the masterbatch and casting the tire body onto the tread stock should be as short as possible. Adhesion of tread to body is dependent upon little chain extension of the tread stock prior to adding the body to the mold. The rate of chain extension may be controlled by any means. Alternatively, a solid rubber carcass may be positioned against the liquid rubber-polyester tread. In such cases, an adhesive might be needed.

The foregoing is illustrative, and other procedures and apparatus may be employed as desired.

The drawing is a section of a pneumatic tire such as prepared according to this invention. The tread may be of a desired thickness and the dividing line between the tread and the body of the tire may be varied in location and configuration.

The invention provides a tread composition on to which a tire body may be centrifugally molded. The tread and sidewall portions have dissimilar properties yet are firmly attached to produce an integral structure. An adhesive may be used in uniting them.

The tire is usually formed by first locating the tread stock in a tire mold and then positioning a tire body-forming composition against the tread and curing both the tread and the tire body compositions together, using an adhesive if required to form a strong bond between them. The tire body may be cast from a liquid composition. It may be a conventional pre-formed tire body of natural or synthetic rubber. Any tire body may be used, formed in any manner.

Reinforcing cords or plies may be placed in the mold over the tread before casting the tire body, but no reinforcement is necessary. Short reinforcing filaments may be compounded with the tread stock, if desired.

If polybutadiene units are present in the backbone of the polymer in the tread, whatever the elastomer from which the polymer is derived, it preferably comprises some 1,2-structure, and the 1,2-structure may be as high as 60 per cent by 5 to 15 per cent is preferably for wear and low temperature properties.

In producing the tread stock, hydroxy polymers may be freely mixed or interchanged, and the chain extension can be accomplished by mixing chain-extending agents together.

In commercial production there usually will be moisture and perhaps other impurities present in the polymer, carbon black, and other pigments which together form the masterbatch. Therefore, ratios of chain-extending agent to reactive terminals greater than 1.0 might be needed. Choice of the correct ratio of chain-extending agent to reactive terminal is made conveniently by curing small quantities of a masterbatch with various levels of chain-extending agent to give different ratios and selecting from these the one ratio which gives the desired vulcanizate properties.

TIRE PRODUCTION

The art refers to apparatus which may be used in the casting or tires, such as disclosed in Beneze U.S. Pat. No. 3,555,141, for instance. Such apparatus or improvements upon the same may be used in producing the tires from the tread compositions of this invention. If the tire body is to be cast, the beads are supported in the mold cavity in any suitable manner. The tread is suitably located in the tread portion of the mold before casting the tire body against it. Compositions suitable for casting the body are known in the art. See, for example, British Pat. No. 1,139,643.

DESCRIPTION OF PREFERRED EMBODIMENT

The present invention relates to the production of tread-stock compositions in a mold. The tire body may be centrifugally cast in the mold on to the tread stock. The tread-stock composition is usually so viscous that it will not flow easily during the casting of the body. It may be applied to the mold by troweling or the like, and a template similar to but longer than that described in Beneze U.S. Pat. No. 3,555,141 may be used.

In the molding of a tire, it may be found desirable to use a parting agent, such as a poly (methyl silicone) oil applied as an aerosol spray to the inner surfaces of the mold to aid in separation of the molded product from the mold.

The following examples are illustrative of the invention. The claims are not limited thereto.

In the examples which follow, trade names and designations are used to identify materials, the compositions of which are given below. The ARCO compositions (butadiene-styrene) all have polybutadiene backbones with this approximate microstructure:

| | |
|---|---|
| Trans-1,4 | 60% |
| Cis-1,4 | 20% |
| Vinyl-1,2 | 20% |

They are liquid, hydroxyl-terminated polymers of the following typical compositions and properties as given in ARCO's Product Bulletin BD-1, page 3:

| ARCO DESIGNATION | CS-15 |
|---|---|
| Composition: | |
| Butadiene, wt. % | 75 |
| Styrene, wt. % | 25 |
| Viscosity, poises at 30° C. | 225 |
| Hydroxyl content, meq/gm | 0.65 |
| Moisture, wt. % | 0.05 |
| Iodine number | 335 |
| Functionality* | 2.5–2.8 |

*The number of hydroxy groups per polymer chain.

The properties vary somewhat as recorded in the different ARCO Bulletins.

Other designations are:

DiCup R = 100% dicumyl peroxide sold by Hercules.

Ethyl 702 = 4,4'-methylenebis(2,6-di-t-butylphenol), an antioxidant manufactured by Ethyl Corp.

ISAF Black = Intermediate super abrasion oil-furnace black.

POLYMEG 2000 = Hydroxy-terminated polytetrahydrofuran sold by Quaker Oats.

Raven 1000 Black = Ink grade carbon black sold by Cities Service Company.

Santocure NS = N-t-butyl-2-benzothiazolesulfenamide, sold by Monsanto.

SHELL DUTREX 916 = Rubber processing oil sold by Shell Oil Co.

The properties reported below were determined by the following recognized tests:

Compression set = ASTM D-395 Method B.

100% or 300% Modulus; Tensile Strength; Ultimate Elongation: = ASTM D-412-68

Shore "A" Hardness = ASTM D-2240-64T

Steel Ball Rebound = J. H. Dillon, I. B. Prettyman and G. L. Hall, J. Appl. Phys., 15, 309 (1944).

In the examples and elsewhere, "parts" refers to parts by weight per 100 parts of polymer, but in referring to classes of materials, such as poly(carbonyl halide) generally, for example, it will be appreciated that the different members of any class of additives and also the polymers will have different molecular weights, so that the amounts given are to be considered suggestive.

EXAMPLE 1

| RECIPE: | | | |
|---|---|---|---|
| 100 | Parts | ARCO CS-15 | |
| 50 | Parts | Raven 1000 Carbon Black | |
| 4.8 | Parts | Shell Dutrex 916 | |
| 5 | Parts | MgO | |
| 1 | Parts | Ethyl 702 | |
| 6.80 | Parts | Adipoyl chloride | |
| COCl/OH | | | 1.2 |

PHYSICAL PROPERTIES:
Stress-Strain Properties-
Cured 45'/280° F.

| | |
|---|---|
| 100% Modulus, psi | 300 |
| Tensile Strength, psi | 775 |
| Ultimate Elongation, % | 250 |
| 212° F. Tensile Strength, psi | 425 |

Rebound - Cured 60'/280° F.

| | |
|---|---|
| % at 73° F. | 53 |
| % at 212° F. | 55 |
| Shore "A" Hardness - 60'/280° F. | 60 |

Compression Set - 22 hrs./158° F.- Cured 60'/280° F.

| | |
|---|---|
| % | 77 |

EXAMPLE 2

| RECIPE: | | |
|---|---|---|
| 100 | parts | ARCO CS-15 |
| 50 | parts | Raven 1000 Carbon Black |

-continued
EXAMPLE 2

| | | |
|---|---|---|
| 4.8 | parts | Shell Dutrex 916 |
| 5 | parts | MgO |
| 1 | parts | Ethyl 702 |
| 2.5 | parts | ZnO |
| 2 | parts | Stearic acid |
| 1.7 | parts | Sulfur |
| 1.2 | parts | Santocure NS |
| 6.80 | parts | Adipoyl chloride |
| COCl/OH | | 1.2 |

PHYSICAL PROPERTIES:

| Stress-Strain Properties- Cured 45'/280° F. | |
|---|---|
| 100% Modulus, psi | 200 |
| Tensile Strength, psi | 250 |
| Ultimate Elongation, % | 100 |
| 212° F. Tensile Strength | 50 |
| Rebound - Cured 60'/280° F. | |
| % at 73° F. | 38 |
| % at 212° F. | 41 |
| Shore "A" Hardness - 60'/280° F. | 48 |
| Compression Set - 22 Hrs./158° F. Cured 60'/280° F. | |
| % | 100 |

EXAMPLE 2

Example 2 shows the use of an auxiliary sulfur plus an acid chloride cure. Results were poor, but it is expected that higher COCl/OH ratios would improve these results. Compare these results with those of Example 1.

EXAMPLE 3

| RECIPE: | 100 | parts | ARCO CS-15 |
|---|---|---|---|
| | 50 | parts | ISAF |
| | 5 | parts | Shell Dutrex 916 |
| | 5 | parts | MgO |
| | 1 | parts | Ethyl 702 |
| | 6.81 | parts | Adipoyl chloride |
| COCl/OH | | | 1.20 |

PHYSICAL PROPERTIES:

| Stress-Strain Properties- Cured 45'/280° F. | |
|---|---|
| 100% Modulus, psi | 500 |
| Tensile Strength, psi | 900 |
| Ultimate Elongation, % | 200 |
| 212°F. Tensile Strength, psi | 430 |
| Rebound - Cured 60'/280° F. | |
| % at 73° F. | 40 |
| % at 212° F. | 47 |
| Shore "A" Hardness - 60'/280° F. | 69 |
| Compression Set - 22 Hrs. at 158° F. Cured 60'/280° F. | |
| % | 73 |

EXAMPLE 4

| RECIPE: | 100 | parts | ARCO CS-15 |
|---|---|---|---|
| | 50 | parts | ISAF |
| | 5 | parts | Shell Dutrex 916 |
| | 5 | parts | MgO |
| | 1 | parts | Ethyl 702 |
| | 2 | parts | DiCup R |
| | 6.81 | parts | Adipoyl chloride |
| COCl/OH | | | 1.20 |

PHYSICAL PROPERTIES:

| Stress-Strain Properties- Cured 45'/280° F. | |
|---|---|
| 100% Modulus, psi. | 675 |
| Tensile Strength, psi | 1200 |
| Ultimate Elongation, % | 160 |
| 212° F. Tensile Strength, psi | 600 |
| Rebound - Cured 60'/280° F. | |
| % at 73° F. | 46 |
| % at 212° F. | 55 |
| Shore "A" Hardness - 60'/280° F. | 74 |
| Compression Set - 22 Hrs./158° F. Cured 60'/280° F. | |
| % | 59 |

EXAMPLE 4

Example 4 shows the use of an auxiliary peroxide cure, and should be compared with Example 3. Note that use of peroxide here resulted in higher tensile strength, higher rebound, higher Shore A, and lower compression set.

EXAMPLE 5

| RECIPE: | 100 | parts | POLYMEG 2000 |
|---|---|---|---|
| | 50 | parts | ISAF |
| | 15 | parts | MgO |
| | 15 | parts | Shell Dutrex 916 |
| | 1 | parts | Ethyl 702 |
| | 10.98 | parts | Adipoyl chloride |
| COCl/OH | | | 1.20 |

PHYSICAL PROPERTIES:

| Stress-Strain Properties- Cured 45'/280° F. | |
|---|---|
| Tensile Strength, psi | 375 |
| Ultimate Elongation, % | 80 |
| Rebound - Cured 45'/280° F. | |
| % at 73° F. | 50 |
| Shore "A" Hardness - 45'/280° F. | 85 |

EXAMPLE 5

Example 5 shows that hydroxy-terminated elastomers other than those with conventional solid rubber backbones can be used also. In this case a polyether was used.

EXAMPLE 6

| RECIPE: | 100 | parts | POLYMEG 2000 |
|---|---|---|---|
| | 50 | parts | ISAF |
| | 15 | parts | MgO |
| | 15 | parts | Shell Dutrex 916 |
| | 1 | parts | Ethyl 702 |
| | 3 | parts | Trimethylolethane |
| | 16.01 | parts | Adipoyl chloride |
| COCl/OH | | | 1.00 |

PHYSICAL PROPERTIES:

| Stress-Strain Properties- Cured 45'/280° F. | |
|---|---|
| Tensile Strength, psi | 425 |
| Ultimate Elongation, % | 40 |
| Rebound - Cured 45'/280° F. | |
| % at 73° F. | 56 |
| Shore "A" Hardness - 45'/280° F. | 77 |

EXAMPLE 6

Example 6 should be compared with Example 5. In Example 6, an aliphatic triol (trimethylolethane) was added to increase cross-link density.

Although the invention relates more particularly to tire treads, the elastomer is a general purpose elastomer and may be used for other purposes such as hose, shoe soles and various mechanical goods.

I claim:

1. A tread of a pneumatic tire which comprises the chain-extending reaction product of a chain-extending di(carbonyl halide) of the formula Hal—O:C—C:O—Hal or Hal—O:C—X—C:O—Hal in which Hal is chlorine or bromine and X is an aliphatic or aromatic hydrocarbon moiety, and a polymer from the class consisting of (a) polyhydroxy homopolymers and copolymers of conjugated dienes which contain 4 to 6 carbon atoms, (b) polyhydroxy copolymers of such a diene and an aromatic vinyl monomer, (c) polyhydroxy copolymers of such a diene and an aliphatic vinyl nitrile monomer, (d) polyhydroxy polyisobutylene and ethylene-propylene copolymer, (e) polyhydroxy polyethers and (f) polyhydroxy polyesters, which polymers contain 2 or 3 hydroxy groups with sufficient reinforcing pigment for a tire tread.

2. A tread of a pneumatic tire which comprises a sulfur-reacted chain-extended reaction product of a chain-extending di(carbonyl halide) of the formula Hal—O:C—C:O—Hal or Hal—O:C—X—C:O—Hal in which Hal is chlorine or bromine and X is an aliphatic or aromatic hydrocarbon moiety, and a polymer from the class consisting of (a) polyhydroxy homopolymers and copolymers of conjugated dienes which contain 4 to 6 carbon atoms, (b) polyhydroxy copolymers of such a diene and an aromatic vinyl monomer, (c) polyhydroxy copolymers of such a diene and an aliphatic vinyl nitrile monomer, (d) polyhydroxy polyisobutylene and ethylene-propylene copolymer, (e) polyhydroxy polyethers and (f) polyhydroxy polyesters, which polymers contain 2 or 3 hydroxy groups with sufficient reinforcing pigment for a tire tread.

3. A tread of a pneumatic tire which comprises a peroxide-reacted chain-extended reaction product of a chain-extending di(carbonyl halide) of the formula Hal—O:C—C:O—Hal or Hal—O:C—X—C:O—Hal in which Hal is chlorine or bromine and X is an aliphatic or aromatic hydrocarbon moiety, and a polymer from the class consisting of (a) polyhydroxy homopolymers and copolymers of conjugated dienes which contain 4 to 6 carbon atoms, (b) polyhydroxy copolymers of such a diene and an aromatic vinyl monomer, (c) polyhydroxy copolymers of such a diene and an aliphatic vinyl nitrile monomer, (d) polyhydroxy polyisobutylene and ethylene-propylene copolymer, (e) polyhydroxy polyethers and (f) polyhydroxy polyesters, which polymers contain 2 or 3 hydroxy groups with sufficient reinforcing pigment for a tire tread.

4. A tread of a pneumatic tire which comprises an aliphatic-triol-reacted chain-extended reaction product of a chain-extending di(carbonyl halide) of the formula Hal—O:C—C:O—Hal or Hal—O:C—X—C:O—Hal in which Hal is chlorine or bromine and X is an aliphatic or aromatic hydrocarbon moiety, and a polymer from the class consisting of (a) polyhydroxy homopolymers and copolymers of conjugated dienes which contain 4 to 6 carbon atoms, (b) polyhydroxy copolymers of such a diene and an aromatic vinyl monomer, (c) polyhydroxy copolymers of such a diene and an aliphatic vinyl nitrile monomer, (d) polyhydroxy polyisobutylene and ethylene-propylene copolymer, (e) polyhydroxy polyethers and (f) polyhydroxy polyesters, which polymers contain 2 or 3 hydroxy groups with sufficient reinforcing pigment for a tire tread.

5. The tread of claim 1 in which the polymer is polyhydroxy polybutadiene.

6. The tread of claim 1 in which the polymer is polyhydroxy butadiene-styrene.

7. The tread of claim 1 in which the polymer is a polyhydroxy ether.

8. The tread of claim 5 which has been auxiliarly cured with sulfur.

9. The tread of claim 6 which has been auxiliarly cured with perotides.

10. The tread of claim 7 which has been auxiliarly cured with an aliphatic triol.

* * * * *

UNITED STATES PATENT OFFICE
CERTIFICATE OF CORRECTION

Patent No. 3,928,291　　　　　　　Dated December 23, 1975

Inventor(s) Mr. Joseph C. Sanda, Jr.

It is certified that error appears in the above-identified patent and that said Letters Patent are hereby corrected as shown below:

Column 5, line 27, casting or tires should read as -- casting of tires --

Column 10, line 33, perotides should be -- peroxides --

Signed and Sealed this

*twenty-third* Day of *March 1976*

[SEAL]

Attest:

RUTH C. MASON
*Attesting Officer*

C. MARSHALL DANN
*Commissioner of Patents and Trademarks*